United States Patent
Amin et al.

(10) Patent No.: US 11,507,621 B1
(45) Date of Patent: Nov. 22, 2022

(54) METHODS AND SYSTEMS FOR GENERATING COMMUNICATIONS ASSOCIATED WITH OPTIMIZATION CODES

(71) Applicant: THE TRADE DESK, INC., Ventura, CA (US)

(72) Inventors: Victor Amin, Denver, CO (US); Devin Pullman, Boulder, CO (US); Julius Rentergent, New York City, NY (US); Alexandre K. W. Navarro, London (GB); Mark Davenport, New York, NY (US); Jair Cazarin, London (GB); Simon Houghton, London (GB); James Innocent, Seattle, WA (US); Christopher Thorne, Boulder, CO (US)

(73) Assignee: THE TRADE DESK, INC., Ventura, CA (US)

( * ) Notice: Subject to any disclaimer, the term of this patent is extended or adjusted under 35 U.S.C. 154(b) by 0 days.

(21) Appl. No.: 17/526,968

(22) Filed: Nov. 15, 2021

(51) Int. Cl.
| | |
|---|---|
| *G06F 16/901* | (2019.01) |
| *G06F 8/41* | (2018.01) |
| *G06F 16/9038* | (2019.01) |
| *G06F 16/9035* | (2019.01) |

(52) U.S. Cl.
CPC .......... *G06F 16/901* (2019.01); *G06F 8/454* (2013.01); *G06F 16/9035* (2019.01); *G06F 16/9038* (2019.01)

(58) Field of Classification Search
None
See application file for complete search history.

(56) References Cited

U.S. PATENT DOCUMENTS

| | | | |
|---|---|---|---|
| 2018/0253455 A1* | 9/2018 | Akitomi | G06F 16/221 |
| 2020/0303071 A1* | 9/2020 | Miller | G16H 50/70 |
| 2021/0020295 A1* | 1/2021 | Li | A61B 5/486 |

OTHER PUBLICATIONS https://iabtechlab.com/press-releases/major-advertising-trade-bodies-unveil-data-transparency-label/, 2022, IAB Technology Laboratory.
https://www.truthset.io/truthscores, 2021, Truthset.
https://www.anaaimm.net/webinars/data-transparency-removing-data-blindfolds-to-connect-with-multicultural-consumers-successfully, Data Transparency: Removing Data Blindfolds to Connect with Multicultural Consumers Successfully, 2020, ANA AIMM.

\* cited by examiner

*Primary Examiner* — Syling Yen
*Assistant Examiner* — Navneet Gmahl
(74) *Attorney, Agent, or Firm* — Baker & McKenzie LLP

(57) ABSTRACT

This disclosure is directed to systems and methods for generating a communication associated with an optimization code. Generating a communication may include generating an optimization code, which may include (i) receiving a first data associated with one or more of a first computing device and a first computing device user; (ii) generating at least two confirmation codes, including one or more of a verification code, a consistency code, and an activity code, which may be associated with a comparative accuracy of the first data, a comparative consistency of the first data, and a comparative activity of the first data, respectively; and (iii) generating an optimization code which may be based, at least in part, on the at least two confirmation code and associated with a relative predictability of the first data.

20 Claims, 5 Drawing Sheets

METHODS AND SYSTEMS FOR GENERATING COMMUNICATIONS ASSOCIATED WITH OPTIMIZATION CODES

TECHNICAL FIELD

The present disclosure relates in general to the field of communications and more particularly to the generation of optimization codes and their use in generating communications.

BACKGROUND

Target communicators need faster and more efficient tools to evaluate third-party data and optimize performance of communications.

SUMMARY

According to some embodiments, a method for generating, at one or more servers, a communication associated with an optimization code may comprise: receiving, at the one or more servers and from a first computing device, a first data associated with the first computing device and a first computing device user, the first data comprising at least one trait associated with the first computing device user and wherein the at least one trait is associated with a second data; generating at the one or more servers, at least two confirmation codes, wherein each of the at least two confirmation codes comprises at least one of: a verification code, wherein the verification code is based on a third data and a comparison of at least one verified trait associated with the first computing device user to the second data associated with the at least one trait associated with the first computing device user; and associated with a comparative accuracy of the second data associated with the at least one trait; a consistency code, wherein the consistency code is: based on a comparison of a fourth data to the first data; and associated with a comparative consistency of the first data; and an activity code, wherein the activity code is: based on an aggregation of a fifth data; and associated with a comparative activity of the first data; storing the at least two confirmation codes at a database associated with the one or more servers; retrieving, at the one or more servers and from the database associated with the one or more servers, at least one retrieved confirmation code; generating, at the one or more servers, at least one raw index, wherein the at least one raw index is based on the at least one retrieved confirmation code and wherein the at least one raw index is generated by transforming the at least one retrieved confirmation code; generating, at the one or more servers, at least one comparative index, wherein the at least one comparative index is based on the at least one raw index and is generated by transforming the at least one raw index; generating, at the one or more servers, a relative locus associated with the at least one comparative index; generating, at the one or more servers, the optimization code, wherein the optimization code is based on the relative locus and is associated with a relative predictability of the first data; and generating, at the one or more servers, the communication based on the optimization code.

According to some embodiments, one of the at least two confirmation codes comprises the verification code, wherein the verification code is generated at the one or more servers by: receiving the third data from a second computing device, wherein the third data comprises the at least one verified trait associated with the first computing device user; generating the comparison by comparing the at least one verified trait associated with the first computing device user to the second data associated with the at least one trait associated with the first computing device user; and generating the verification code.

According to some embodiments, one of the at least two confirmation codes comprises the consistency code, wherein the consistency code is generated at the one or more servers by: receiving the fourth data; comparing the fourth data to the first data; and generating the consistency code.

According to some embodiments, one of the at least two confirmation codes comprises the activity code, wherein the activity code is generated at the one or more servers by: receiving the fifth data; aggregating the fifth data; and generating the activity code.

According to some embodiments, the fourth data is associated with one or more of: contamination of the second data associated with the at least one trait associated with the first computing device user; random user-generated data, wherein the random user-generated data comprises second data not associated with the at least one trait associated with the first computing device user; and theoretical model data, wherein the theoretical model data comprises predictions based on historical data and uses information associated with the first data to further refine a theoretical model.

According to some embodiments, the fifth data is associated with one or more of: the comparative activity of computing device users associated with the at least one trait associated with the first computing device user; percentage of unique computing device users associated with the at least one trait associated with the first computing device user during a given period; and recentness of information associated with the at least one trait associated with the first computing device user.

According to some embodiments, a method comprises generating three confirmation codes comprising one each of the verification code, the consistency code, and the activity code.

According to some embodiments, the second data comprises textual descriptions.

According to some embodiments, the second data comprises categories.

A method for generating a communication associated with an optimization code may comprise: receiving, at the one or more servers and from a first computing device, a first data associated with the first computing device and a first computing device user, the first data comprising at least one trait associated with the first computing device user and wherein the at least one trait is associated with one or more second data; generating at the one or more servers, at least three confirmation codes, wherein the at least three confirmation codes comprise each of: a verification code, wherein the verification code is generated at the one or more servers by: receiving a third data from a second computing device, wherein the third data comprises at least one verified trait associated with the first computing device user, comparing the at least one verified trait associated with the first computing device user with the second data associated with the at least one trait associated with the first computing device user, and generating the verification code, wherein the verification code is based on a comparison of the at least one verified trait associated with the first computing device user with the second data associated with the at least one trait associated with the first computing device user and is associated with a comparative accuracy of the second data associated with the at least one trait; a consistency code, wherein the consistency code is generated at the one or more servers by: receiving a fourth data, wherein the fourth data is associated with any one or more of: contamination of the second data associated with the at least one trait associated with the first computing device user, random user-generated data, wherein the random user-generated data comprises second data not associated with the at least one trait associated with the first computing device user, and theoretical model data, wherein the theoretical model data comprises predictions based on historical data and uses information associated with the first data to further refine a theoretical model, comparing the fourth data to the first data, and generating the consistency code, wherein the consistency code is based on the comparison of the fourth data to the first data and is associated with a comparative consistency of the first data; an activity code, wherein the activity code is generated at the one or more servers by: receiving a fifth data, wherein the fifth data is associated with any one or more of: comparative activity of computing device users associated with the at least one trait associated with the first computing device user, percentage of unique computing device users associated with the at least one trait associated with the first computing device user during a given period, and recentness of information associated with the at least one trait associated with the first computing device user, aggregating the fifth data, and generating the activity code, wherein the activity code is based on the aggregation of the fifth data and is associated with a comparative activity of the first data; storing the two or more confirmation codes at a database associated with the one or more servers; retrieving, at the one or more servers and from the database associated with the one or more servers, at least one retrieved confirmation code; generating, at the one or more servers, at least one raw index, wherein the at least one raw index is based on the at least one retrieved confirmation code and wherein the at least one raw index is generated by transforming the at least one retrieved confirmation code; generating, at the one or more servers, at least one comparative index, wherein the comparative index is based on the at least one raw index and is generated by transforming the at least one raw index; generating, at the one or more servers a relative locus associated with the at least one comparative index; generating, at the one or more servers, the optimization code, wherein the optimization code is based on the relative locus and is associated with a relative predictability of the first data; and generating, at the one or more servers, the communication based on the optimization code.

In some embodiments, a method may comprise generating three confirmation codes comprising one each of the verification code, the consistency code, and the activity code.

A system may comprise a server, the server comprising: a memory comprising server instructions; and a processing device configured for executing the server instructions, wherein the server instructions cause the processing device to perform operations of: receiving, at one or more of the servers and from a first computing device, a first data associated with the first computing device and a first computing device user, the first data comprising at least one trait associated with the first computing device user and wherein the at least one trait is associated with one or more second data; generating at one or more of the servers, at least two confirmation codes, wherein each of the at least two confirmation codes comprises at least one of: a verification code, wherein the verification code is: based on a comparison of at least one verified trait associated with the first computing device user to the second data associated with the at least one trait associated with the first computing device user; and associated with a comparative accuracy of the second data associated with the at least one trait; a consistency code, wherein the consistency code is: based on a comparison of a fourth data to the first data; and associated with a comparative consistency of the first data; and an activity code, wherein the activity code is: based on an aggregation of a fifth data; and associated with a comparative activity of the first data; storing the two or more confirmation codes at a database associated with one or more of the servers; retrieving, at one or more of the servers and from the database associated with one or more of the servers, at least one retrieved confirmation code; generating, at one or more of the servers, at least one raw index, wherein the at least one raw index is based on the at least one retrieved confirmation code and wherein the at least one raw index is generated by transforming the at least one retrieved confirmation code; generating, at one or more of the servers, at least one comparative index, wherein the comparative index is based on the at least one raw index and is generated by transforming the at least one raw index; generating, at one or more of the servers a relative locus associated with the at least one comparative index; generating, at one or more of the servers, the optimization code, wherein the optimization code is based on the relative locus and is associated with a relative predictability of the first data; and generating, at one or more of the servers, the communication based on the optimization code.

According to some embodiments, one of the at least two confirmation codes comprises the verification code, and the server instructions cause the processing device to generate the verification code by performing the operations of: receiving a third data from a second computing device, wherein the third data comprises the at least one verified trait associated with the first computing device user; generating the comparison by comparing the at least one verified trait associated with the first computing device user to the second data associated with the at least one trait associated with the first computing device user; and generating the verification code.

According to some embodiments, one of the at least two confirmation codes comprises the consistency code, and the server instructions cause the processing device to generate the consistency code by performing the operations of: receiving the fourth data; comparing the fourth data to the first data; and generating the consistency code.

According to some embodiments, one of the at least two confirmation codes comprises the activity code, and the server instructions cause the processing device to generate the activity code by performing the operations of: receiving the fifth data; aggregating the fifth data; and generating the activity code.

According to some embodiments, the fourth data is associated with one or more of: contamination of the second data associated with the at least one trait associated with the first computing device user; random user-generated data, wherein the random user-generated data comprises second data not associated with the at least one trait associated with the first computing device user; and theoretical model data, wherein the theoretical model data comprises predictions based on historical data and uses information associated with the first data to further refine a theoretical model.

According to some embodiments, the fifth data is associated with one or more of: comparative activity of computing device users associated with the at least one trait associated with the first computing device user; percentage of unique computing device users associated with the at least one trait associated with the first computing device user during a given period; and recentness of information associated with the at least one trait associated with the first computing device user.

According to some embodiments, the server instructions cause the processing device to generate three confirmation codes comprising one each of the verification code, the consistency code, and the activity code.

BRIEF DESCRIPTION OF THE DRAWINGS

The disclosure is illustrated by way of example, and not by way of limitation in the figures of the accompanying drawings in which like reference numerals are used to refer to similar elements. The various elements shown in the figures that follow may be optional depending on a given embodiment without departing from the principles provided in this disclosure.

DETAILED DESCRIPTION

Figure 1:
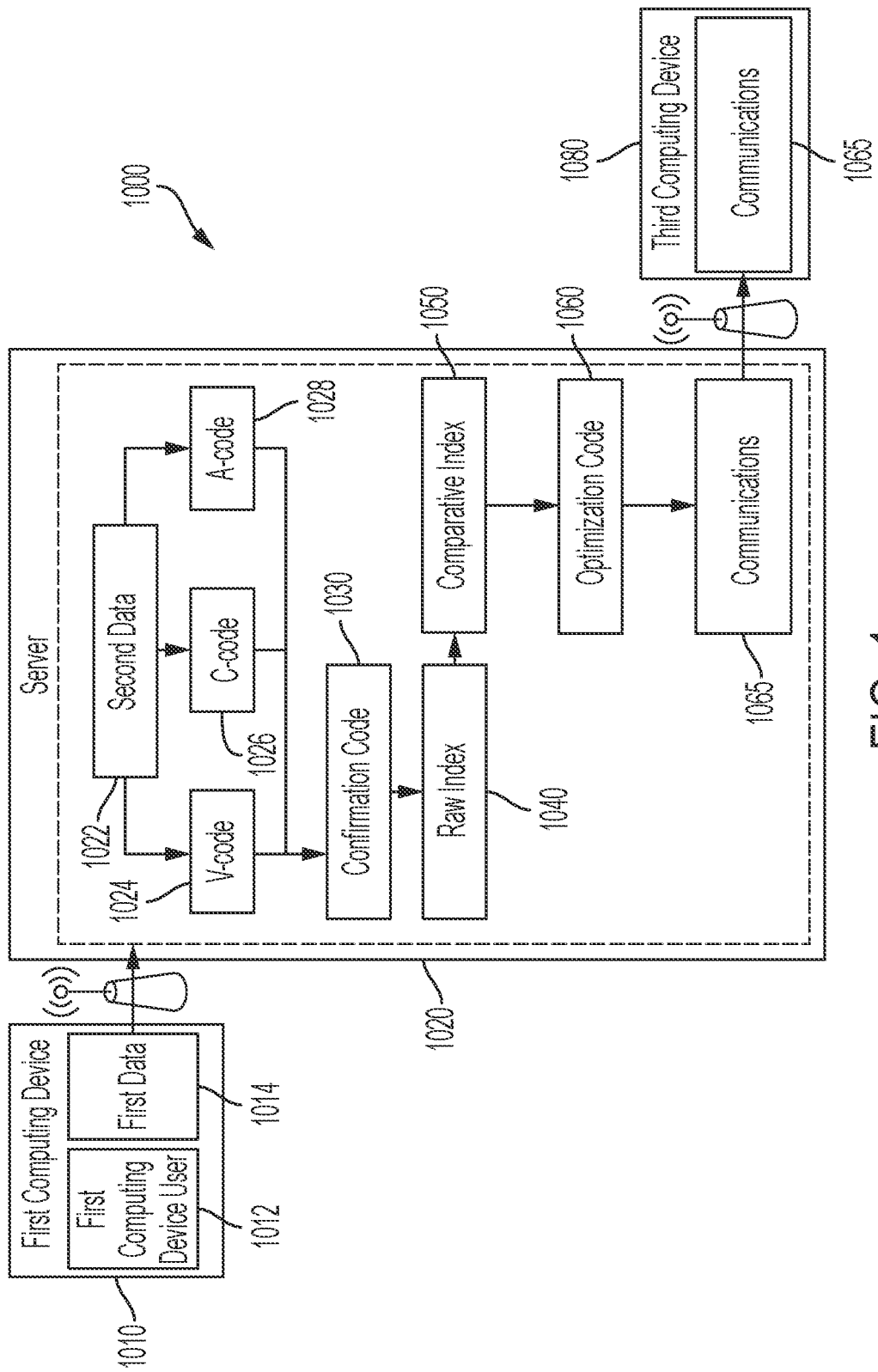
FIG. 1 illustrates a schematic block of a system for generating communications associated with optimization codes, according to some embodiments of the disclosure.

The present disclosure relates to systems and methods for generating communications associated with optimization codes. Generation of optimization codes may be associated with assessing and ranking the quality of third-party data segments based on an objective assessment of criteria designed to reflect the accuracy, optimization potential, and predictability of third-party data segments.

In the following detailed description, numerous specific details are set forth by way of examples in order to provide a thorough understanding of the relevant teachings. However, the present teachings may be practiced with or without such specific details. In other instances, well-known methods, procedures, components, and/or circuitry have been described at a relatively high level, without detail, in order to avoid unnecessarily obscuring aspects of the present teachings. The various technologies described in this specification generally relate to communications in complex computing networks, which may be used to monitor, used to initiate, or may be otherwise associated with execution events.

It is understood that any features of any embodiment described herein may be incorporated into any other embodiment described herein. Features of different embodiments can be combined to form new embodiments. Further, any one or more of the steps, operations, etc., described herein may be performed in the order described or in any order. Any one or more of the steps, operations, etc., described herein may be removed and additional steps may be added. Although the present disclosure is related to communications in complex computing networks, it should also be understood that any one or more of the methods, systems, operations, etc., described herein may be associated with other types of communications and networks. The terms communication channel and network communication channel may be used interchangeably. It is understood that any reference to a communication channel (e.g., first communication channel, second communication channel, third communication channel) or to a network communication channel (e.g., first network communication channel, second network communication channel, etc.) could mean any communication channel. For example, a first communication channel and a second communication channel could be the same communication channel or different communication channels.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill in the art may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

A system for generating a communication associated with an optimization code may comprise one or more servers, which may comprise (i) a memory comprising server instructions and (ii) a processing device configured for executing the server instructions. According to some embodiments, the server instructions may cause the processing device to perform one or more of the operations described below.

Illustrated in FIG. 1 is a high level system 1000 for generating a communication associated with an optimization code. An optimization code may be associated with assessing and ranking the quality of third-party data segments according to some embodiments of this disclosure. In the depicted implementation, the system 1000 may comprise a server 1020, which may perform the operation of receiving, at one or more servers 1020 or on an external server and from a first computing device 1010, a first data 1014 associated with the first computing device 1010 and a first computing device user 1012. The first data 1014 may comprise at least one trait associated with the first computing device user 1012, wherein the at least one trait is associated with one or more second data 1022. According to some embodiments, a first data 1014 may be comprised of a string of alphanumeric and/or symbolic characters of any length and may be associated with one or a combination of traits associated with a first computing device user 1012. For example, in some embodiments, a trait may be any one or more of height, weight, geolocation, age, gender, sex, marital status, etc. In some embodiments, the trait may be any trait that may describe a user of the system or of a computing device (e.g., first, second, third computing devices). A first data 1014 may be associated with a first computing device. For example, where a first device user may be a user of multiple devices, a first data 1014 may identify the particular computing device associated with the first user at a particular time.

Each trait may be associated with a second data 1022. A second data 1022 may be comprised of a string of alphanumeric and/or symbolic characters of any length and may be associated with a description of a trait. For example, where a trait is height, a second data 1022 may indicate a height of "5 feet, 10 inches." In another example, where a trait is sex, a second data 1022 may indicate a sex of "Female."

A server 1020 may perform the operation of using the received data (e.g., first data 1014, second data 1022) to generate at least two confirmation codes 1030. A confirmation code 1030 may be generated by transforming the received data (e.g., first data 1014, second data 1022), which may include, but is not limited to, e.g. combining, separating, separating and recombining, reordering, comparing, hashing, encrypting, stacking, organizing, and performing mathematical operations on the received data (e.g., first data 1014, second data 1022). More robust descriptions of generating potential confirmation codes 1030, according to some embodiments, are disclosed below in conjunction with the methods.

A confirmation code 1030 may include any one or more of a verification code (hereinafter, a "V-code 1024"), a consistency code 1026 (hereinafter, a "C-code 1026"), and an activity code 1028 (hereinafter, an "A-code 1028"). Although these confirmation code 1030 embodiments, and the methods of generating them, are described in detail throughout the specification, a reader should appreciate that a confirmation code 1030 is not limited to these embodiments, and that a confirmation code 1030, according to this disclosure, may comprise any code (e.g., any string of alphanumeric and/or symbolic characters of any length) that is generated by transforming (e.g. combining, separating, separating and recombining, reordering, comparing, hashing, encrypting, stacking, organizing, and performing mathematical operations) a gathered data (e.g., first data 1014, second data 1022, third data, fourth data, fifth data, etc.).

A server 1020 may perform the operation of causing the two or more confirmation codes 1030 to be stored at a database associated with the one or more servers 1020. In some embodiments, at least one (e.g., one or more) stored confirmation code 1030 may be retrieved at the one or more servers 1020 and from the database associated with the one or more servers 1020.

A server 1020 may perform the operation of using the one or more retrieved confirmation codes 1030 to generate a raw index 1040. The raw index 1040 may be generated by transforming at least one retrieved confirmation code 1030, which may include, but is not limited to, e.g. combining, separating, separating and recombining, reordering, comparing, hashing, encrypting, stacking, organizing, and performing mathematical operations on the at least one retrieved confirmation code 1030. More robust descriptions of generating a raw index 1040, according to some embodiments, are disclosed below in conjunction with the methods.

A server 1020 may perform the operation of using the raw index 1040 to generate at least one comparative index 1050. The comparative index 1050 may be generated by transforming the raw index 1040, which may include, but is not limited to, e.g. combining, separating, separating and recombining, reordering, comparing, hashing, encrypting, stacking, organizing, and performing mathematical operations on the raw index 1040. More robust descriptions of generating at least one comparative index 1050, according to some embodiments, are disclosed below in conjunction with the methods.

A server 1020 may perform the operation of using the comparative index 1050 to generate a relative locus, which may be associated with the comparative index 1050. The relative locus may be generated by transforming the comparative index 1050, which may include, but is not limited to, e.g. combining, separating, separating and recombining, reordering, comparing, hashing, encrypting, stacking, organizing, and performing mathematical operations on the comparative index 1050. More robust descriptions of generating comparative locus, according to some embodiments, are disclosed below in conjunction with the methods.

A server 1020 may perform the operation of using the relative locus to generate an optimization code 1060. The optimization code 1060 may be generated by transforming the relative locus, which may include, but is not limited to, e.g. combining, separating, separating and recombining, reordering, comparing, hashing, encrypting, stacking, organizing, and performing mathematical operations on the relative locus. More robust descriptions of generating an optimization code 1060, according to some embodiments, are disclosed below in conjunction with the methods.

A server 1020 may perform the operation of using the comparative index 1050 to generate an optimization code 1060. The optimization code 1060 may be generated by transforming the comparative index 1050, which may include, but is not limited to, e.g. combining, separating, separating and recombining, reordering, comparing, hashing, encrypting, stacking, organizing, and performing mathematical operations on the comparative index 1050. More robust descriptions of generating an optimization code 1060, according to some embodiments, are disclosed below in conjunction with the methods.

A server 1020 may perform the operation of using the optimization code 1060 to generate one or more communications 1065 that can then be transmitted to a third computing device 1080. In some embodiments, an optimization code 1060 may indicate the desirability of a target of a communication 1065. For example, in some embodiments, an optimization code 1060 may indicate the likelihood that the target of a communication possesses certain desired characteristics. In some embodiments, an optimization code 1060 may indicate whether or not a target meets the threshold criteria to receive a communication.

Figure 2:
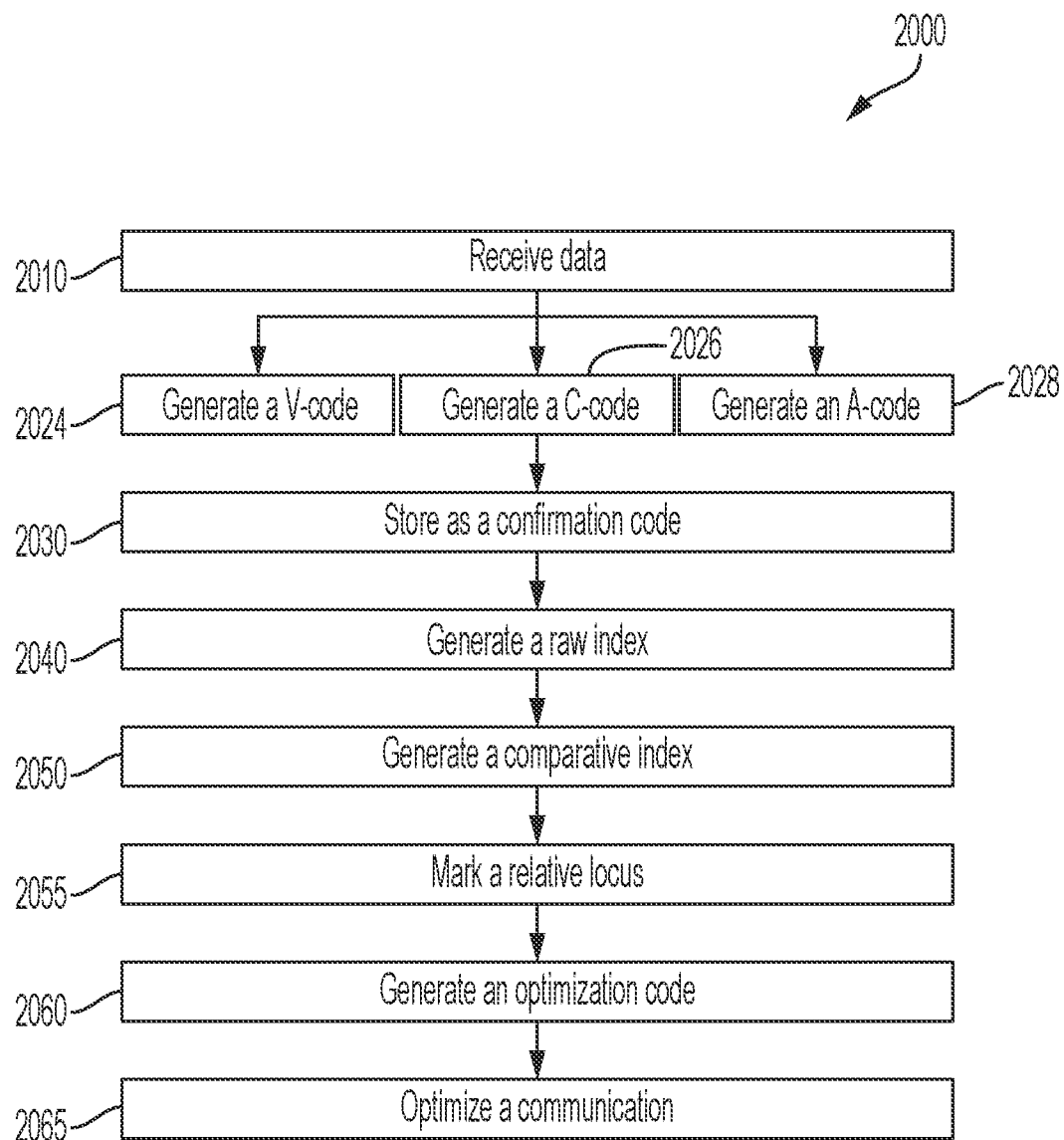
FIG. 2 illustrates a functional block diagram of a method for generating communications associated with optimization codes, according to some embodiments of the disclosure.

One embodiment of the present disclosure is illustrated in FIG. 2 where a method for generating a communication associated with an optimization code may comprise any one or a combination of: receiving a first data that is associated with one or more of a first device, a first device user, and a second data 2010; generating at least two confirmation codes (2024, 2026, 2028) in response to one or more of the first data and the second data; storing the confirmation codes at a database 2030, generating at least one raw index 2040; generating at least one comparative index 2050; generating a relative locus 2055; generating an optimization code 2060; and generating a communication 2065.

A method 2000 for generating a communication associated with an optimization code may comprise receiving data 2010. In some embodiments, data may comprise a first data, which may be associated with a first computing device and, according to some embodiments, a user of the first computing device. A first data may comprise at least one trait associated with the first computing device or the first computing device user. A trait may comprise any trait that may describe a first computing device or a first computing device user. For example, in some embodiments, a trait may be any one or more of height, weight, geolocation, age, gender, sex, marital status, configuration, operating system description, etc. Each trait may be associated with a second data, which may be comprised of a string of alphanumeric and/or symbolic characters of any length and may be associated with a description of a trait. For example, where a trait is height, a second data may indicate a height of "5 foot, 10 inches." In another example, where a trait is sex, a second data may indicate a sex of "Female." A second data may comprise, according to some embodiments, categories (e.g. traits) or textual descriptions (e.g., 5 foot, 10 inches, Female, etc.).

Figure 3:
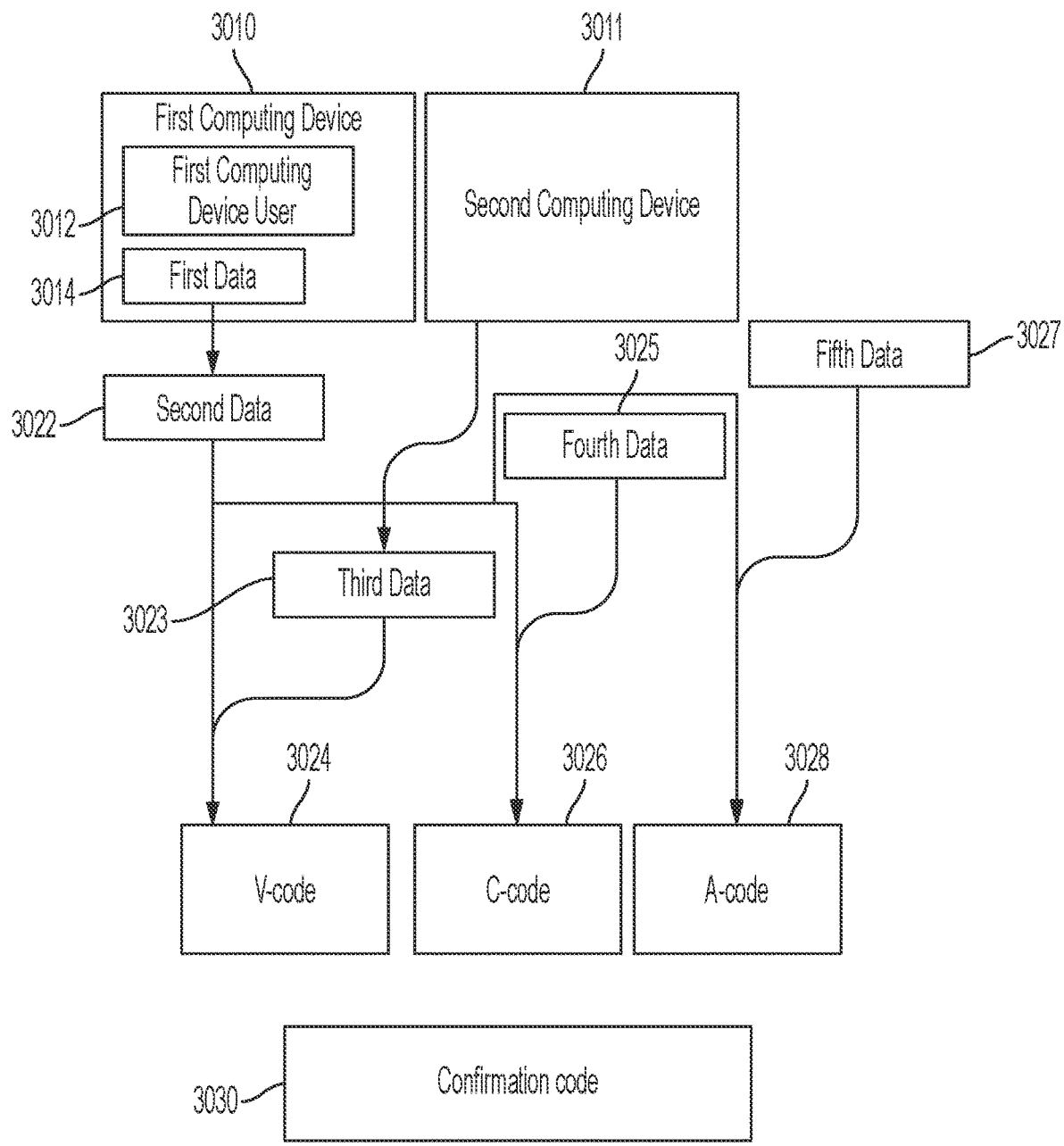
FIG. 3 illustrates a system and method for generating communications associated with optimization codes, according to some embodiments of the disclosure.

Received data may be used to generate one or more confirmation codes and, according to some embodiments, may include a V-code 2022, a C-code 2024, or an A-code 2026. FIG. 3 illustrates, in some embodiments, a method by which first data 3014 and second data 3022 associated with a first computing device user 3012 on a first computing device 3010 may be used to generate at least one of a V-code 3024, a C-code 3026, and an A-code 3028 that may be stored as a confirmation code 3030. A confirmation code may comprise any code (e.g., any string of alphanumeric and/or symbolic characters of any length) and may indicate a value or score based on a value, comparison, etc. In some embodiments, A confirmation code may indicate, without limitation, a yes or no (e.g., affirmative, negative) value, a descriptive (e.g., very close, medium close, not close) value, a numerical value based on a scoring system, etc.

A V-code 3024 may comprise any code (e.g., any string of alphanumeric and/or symbolic characters of any length) that is generated by transforming (e.g. combining, separating, separating and recombining, reordering, comparing, hashing, encrypting, stacking, organizing, performing mathematical operations, etc.) a gathered data (e.g., first data, second data). In some embodiments, A V-code 3024 may be generated at the one or more servers by receiving a third data 3023 from a second computing device 3011. A third data 3023 may comprise at least one verified trait associated with the first computing device user 3012. In some embodiments, a third data 3023 may comprise a fourth data 3025, which may include: potential contamination of the second data 3022 associated with the at least one trait associated with the first computing device user 3012; potential random user-generated data; and/or theoretical model data. A verified trait may comprise any trait including, but not limited to, any one or more of height, weight, geolocation, age, gender, sex, marital status, configuration, operating system description, etc. In one example, a verified trait could be a verified geolocation tag. A verified trait associated with the first computing device user 3012 may then be compared with the second data 3022 associated with the at least one trait associated with the first computing device user 3012 to generate a V-code 3024. To continue the example above, the geolocation description reported by the second data 3022 could be verified against a verified geolocation tag received as a third data 3023. The resulting V-code 3024 may be associated with the comparative accuracy of the second data 3022 associated with the at least one unverified trait. As used herein, the term comparative accuracy may refer to the accuracy (and/or degree of accuracy) of a gathered data (e.g., first data, second data) when it is compared to a verified or reliable data (e.g., third data).

A C-code 3026 may comprise any code (e.g., any string of alphanumeric and/or symbolic characters of any length) that is generated by transforming (e.g. combining, separating, separating and recombining, reordering, comparing, hashing, encrypting, stacking, organizing, and performing mathematical operations) a gathered data (e.g., first data, second data). In some embodiments, a C-code 3026 may be generated at the one or more servers by receiving a fourth data 3025. In various embodiments, the fourth data 3025 could include: potential contamination of the second data 3022 associated with the at least one trait associated with the first computing device user 3012; potential random user-generated data; and/or theoretical model data. Comparing the various types of fourth data 3025 to the first data 3014 may be used to generate a C-code 3026 that may be associated with the comparative consistency of the first data 3014. As used herein, the term comparative consistency may refer to the consistency (and/or degree of consistency) of a gathered data (e.g., first data, second data) when it is compared to a verified or reliable data (e.g., fourth data). A fourth data 3025 may include a third data 3023, which may include at least one verified trait associated with the first computing device user 3012. A more detailed description of a third data 3023 may be found above.

A fourth data 3025 may include potential contamination of the second data 3022 associated with the at least one trait associated with the first computing device user 3012. Potential contamination of the second data 3022 may be determined by the presence of two mutually exclusive categories in a data segment (e.g., second data 3022). For example, if the second data 3022 contains both "male" and "female" as descriptive categories, a fourth data 3025 may comprise an indication (e.g., indicator, tag) that the second data 3022 may be contaminated data. In another example, if the second data 3022 contains both geolocation data for the USA and geolocation data for Europe, a fourth data 3025 may comprise an indication (e.g., indicator, tag) that the second data 3022 may be contaminated data.

A fourth data 3025 may include potential random user-generated data. Random user-generated data may comprise second data 3022 that is not accurately associated with the at least one trait associated with the first computing device user. This potential random user-generated data (e.g., fourth data 3025) may be used to determine background (e.g., coincidental) associations between data in a subset.

A fourth data 3025 may include theoretical model data. Theoretical model (e.g., fourth data 3025) data may be based on predictions that use historical data to predict how consistent a second data 3022 is to historic trends (e.g., a predictive model). In embodiments where a fourth data 3025 comprises theoretical model data of the predictive type (e.g., a predictive model), real-time data may also be used to further refine the theoretical model.

An A-code 3028 may comprise any code (e.g., any string of alphanumeric and/or symbolic characters of any length) that is generated by transforming (e.g. combining, separating, separating and recombining, reordering, comparing, hashing, encrypting, stacking, organizing, and performing mathematical operations) a gathered data (e.g., first data, second data). In some embodiments, an A-code 3028 may be generated at the one or more servers by receiving a fifth data 3027. In various embodiments, a fifth data 3027 could include the comparative activity of the computing device users associated with a subset of first data 3014, the percentage of unique computing device users associated a subset of first data 3014, and/or the recentness of the information associated with a subset of first data 3014.

A fifth data 3027 may comprise comparative activity of the computing device users associated with the at least one trait associated with the first computing device user. As used herein, the term comparative activity may refer to the accuracy (and/or degree of accuracy) of activity associated with (or comprised within) a gathered data (e.g., first data, second data) when it is compared to a verified or reliable data regarding activity (e.g., fifth data). For example, a fifth data 3027 may comprise, according to some embodiments, internet activities, shopping habits, viewing and/or browsing history, information about interests, or any other information which may be associated with a computing device user. In some embodiments, a fifth data 3027 may comprise information about a set of computing device users who may share a same trait (e.g., height, weight, geolocation, age, gender, sex, marital status, configuration, operating system description, etc.) as a first computing device user.

A fifth data 3027 may comprise a percentage of unique computing device users associated with the at least one trait associated with the first computing device user during a given period. For example, where a first data about a first computing device user indicates a trait of "Sex" and where a second data about a first computing device user indicates that the user is "Female," a fifth data 3027 may indicate a number, percentage, share, etc. of all computing device users included in any given data set that are also "Female." In some embodiments, a fifth data 3027 may indicate a number, percentage, share, etc. of all computing device users included in any given data set that are associated with any second data value given about a specific trait.

A fifth data 3027 may comprise an indication of the recentness of the information (e.g., second data) associated with the at least one trait associated with the first computing device user. For example, a fifth data 3027 may indicate whether or not the second data generated or received about a first computing device user was obtained within the past hour, the past day, the past month, the past year, etc. A measure of recentness may comprise any unit of time and is not limited by the examples given above. A measure (e.g., indication) of recentness may be comparative in nature. For example, in some embodiments, the recentness of a second data about a first computing device user may be an indication of the relative recentness (e.g., more recent, less recent) compared to a second data associated with another (e.g., second, third, fourth, etc.) computing device user.

An A-code may be generated by transforming (e.g. combining, separating, separating and recombining, reordering, comparing, hashing, encrypting, stacking, organizing, and performing mathematical operations) a fifth data 3027. In some embodiments, this may include aggregating a collection of fifth data 3027 to generate an A-code 3028 that may be associated with the comparative activity of the first data 3014.

A method 2000 for generating a communication associated with an optimization code may comprise storing at least one confirmation code 3030 (V-code 3024, C-code 3026, A-code 3028, etc.) at a database associated with the one or more servers. In some embodiments, one or more (e.g., at least one) confirmation code 3030 (V-code 3024, C-code 3026, A-code 3028, a retrieved confirmation code, etc.) may be retrieved from a database associated with the one or more servers. In some embodiments, a confirmation code 3030 retrieved from a database associated with the one or more servers may comprise a retrieved confirmation code.

A method 2000 for generating a communication associated with an optimization code may comprise generating a raw index 2040. In some embodiments, a raw index 2040 may be generated by transforming (e.g. combining, separating, separating and recombining, reordering, comparing, hashing, encrypting, stacking, organizing, and performing mathematical operations) one or more (e.g., at least one) confirmation codes 3030. In some embodiments, a raw index 2040 may be generated by transforming (e.g. combining, separating, separating and recombining, reordering, comparing, hashing, encrypting, stacking, organizing, and performing mathematical operations) one or more (e.g., at least one) confirmation codes 3030 that have been retrieved from a database associated with the one or more servers. In some embodiments, a raw index 2040 may comprise a list of confirmation codes 3030 associated with a user of a computing device (e.g., first computing device, second computing device, third computing device, etc.), which may arranged in any order.

Referring back to FIG. 2, a method 2000 for generating a communication associated with an optimization code may comprise generating a comparative index 2050. In some embodiments, a comparative index 2050 may be generated by transforming (e.g. combining, separating, separating and recombining, reordering, comparing, hashing, encrypting, stacking, organizing, and performing mathematical operations) one or more (e.g., at least one) raw indices 2040 such that the comparative index 2050 may be based on the one or more raw indices 2040.

A method 2000 for generating a communication associated with an optimization code may comprise generating a relative locus 2055. In some embodiments, a relative locus 2055 may be generated by transforming (e.g. combining, separating, separating and recombining, reordering, comparing, hashing, encrypting, stacking, organizing, and performing mathematical operations) one or more (e.g., at least one) comparative indices 2050 such that the relative locus 2055 may be based on the one or more comparative indices 2050.

A method 2000 for generating a communication associated with an optimization code may comprise generating an optimization code 2060. In some embodiments, an optimization code 2060 may be generated by transforming (e.g. combining, separating, separating and recombining, reordering, comparing, hashing, encrypting, stacking, organizing, and performing mathematical operations) one or more (e.g., at least one) relative loci 2055 such that the optimization code 2060 may be based on the one or more relative loci 2055.

The comparative index is then used to mark a relative locus 2055. The relative locus is then used to generate an optimization code 2060. The optimization code, in turn, is used to optimize a communication 2065.

Figure 4:
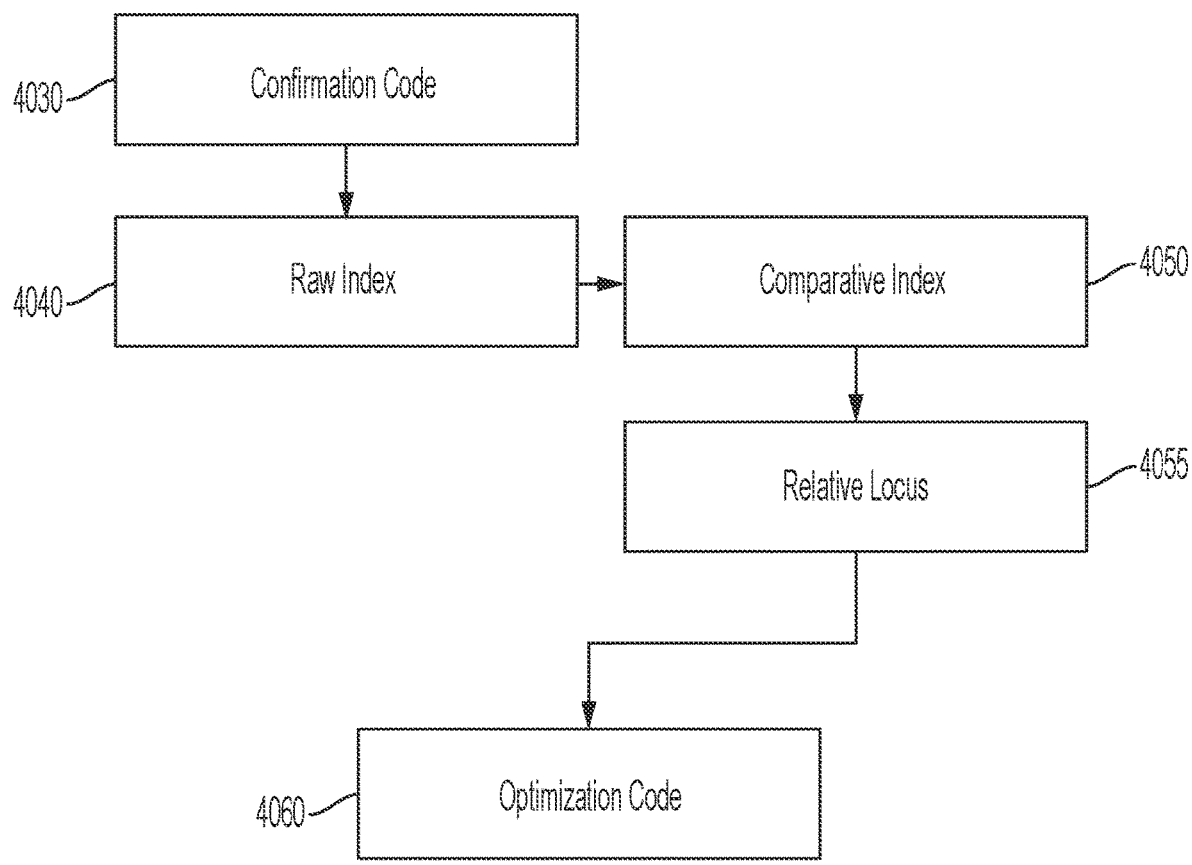
FIG. 4 illustrates a system and method for generating communications associated with optimization codes, according to some embodiments of the disclosure.

FIG. 4 illustrates an example embodiment wherein one or more confirmation codes 4030 are used to generate one or more optimization codes 4060. In this embodiment, one or more confirmation codes 4030 may be transformed to generate a raw index 4040. According to a specific embodiment, the raw index 4040 may be generated by aggregating the weighted averages (e.g., transforming) of each confirmation code 4030. The raw index 4040 may be transformed to generate a comparative index 4050. According to a specific embodiment, transforming a raw index 4040 may include distributing the values in the raw index 4040 across a normal curve to generate at least one comparative index 4050. A comparative index 4050 may be transformed to generate a relative locus 4055. According to a specific embodiment, transforming a comparative index 4050 may include assigning a value that is representative of the normal curve distribution (e.g., mean, median, mode, inflection point, standard deviation, quartile, etc.) of the comparative index 4050, which may comprise a relative locus 4055. In a specific embodiment, a relative locus 4055 may be representative of the relative predictability (e.g., reliability, accuracy, dependability, etc.) of the first data. The relative locus 4055 may be transformed to generate an optimization code 4060. The relative locus 4055 may be transformed, according to a specific embodiment, by standardizing the relative locus 4055. An optimization code 4060 may be used to determine parameters about one or more communications. For example, and without limitation, an optimization code 4060 may be used to determine whether or not a communication is sent, the frequency and/or number of communications that get sent, the content of the communications, the recipient of the communication, etc.

System Environment

Figure 5:
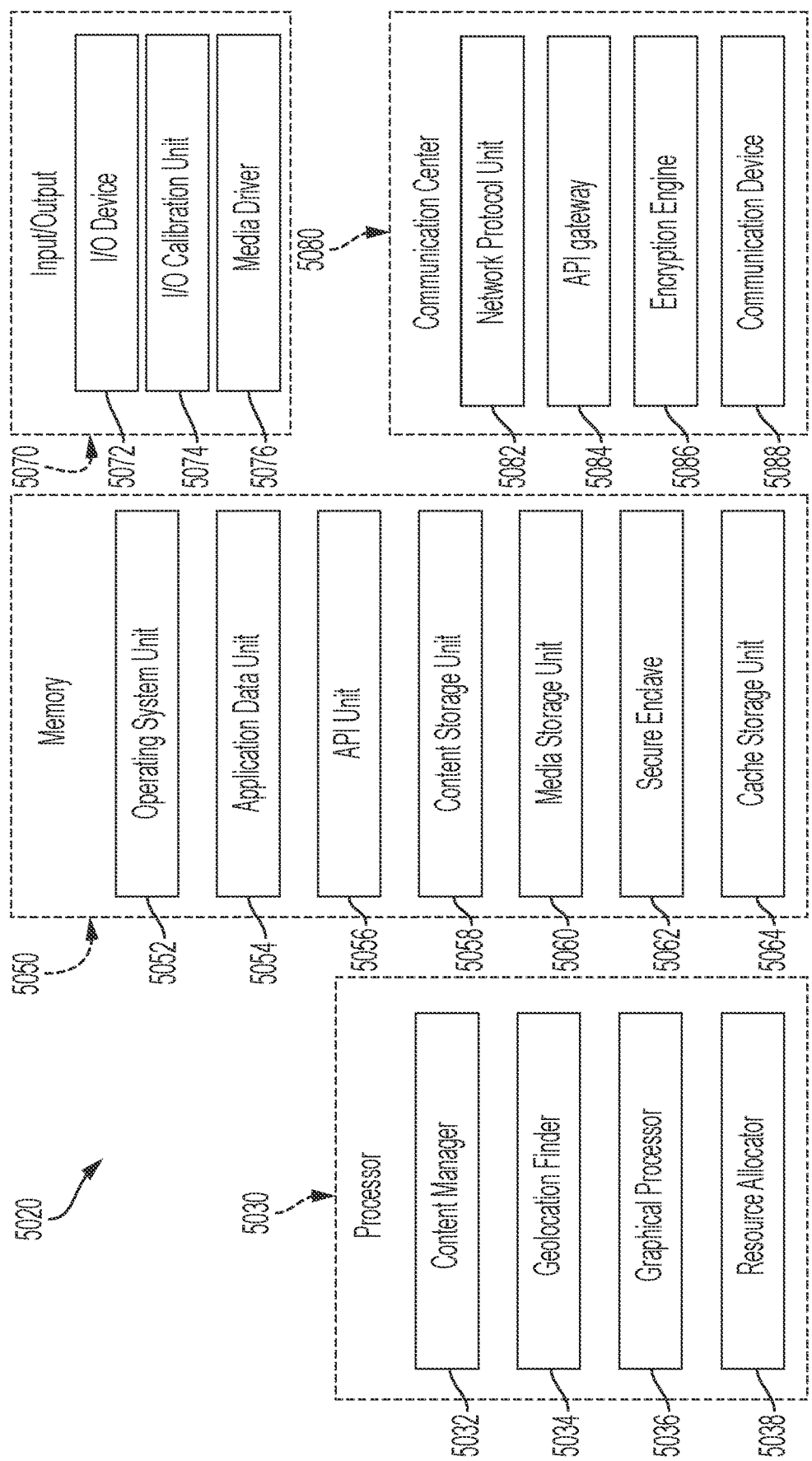
FIG. 5 illustrates a system for generating communications associated with optimization codes, according to some embodiments of the disclosure.

According to some embodiments and as illustrated in FIG. 5, a server 5020 may include, among other elements, any combination of a processor 5030, a memory 5050, an input/output (I/O) 5070, and a communication center 5080. As described in present embodiments, each of the processor 5030, the memory 5050, the I/O 5070, and communication center 5080 may include a plurality of respective units, subunits, and/or elements. Furthermore, each of the processor 5030, the memory 5050, the I/O 5070, and the communication center 5080 may be operatively or otherwise communicatively coupled with each other so as to facilitate the methods and techniques described herein.

The processor 5030 may control any one or more of the memory 5050, the I/O 5070, the communication center 5080, or any other unit which may include the server 5020, as well as any included subunits, elements, components, devices, or functions performed by each or a combination of the memory 5050, the I/O 5070, the communication center 5080 or any other unit which may include the server 5020. Any of the elements or sub-elements of the server 5020 presented here may also be included in a similar fashion in any of the other units, subunits, and devices included in the system 1000 of FIG. 1. Additionally, any actions described herein as being performed by a processor 5030 may be taken by the processor 5030 alone, or by the processor 5030 in conjunction with one or more additional processors, units, subunits, elements, components, devices, and the like. Additionally, while only one processor 5030 may be shown in the figures included here, multiple processors may be present or otherwise included in the server 5020, on an external server, or elsewhere in the system 1000 of FIG. 1. Thus, while instructions may be described as being executed by the processor 5030 or the various subunits of the processor 5032, 5034, 5036, 5038, the instructions may be executed simultaneously, serially, or otherwise by one or more multiple processors 5030.

In some embodiments, a processor 5030 may be implemented as one or more computer processor (CPU) chips, graphical processor (GPU) chips, or some combination of CPU chips and GPU chips, and may include a hardware device capable of executing computer instructions. The processor 5030 may execute any combination of instructions, codes, computer programs, and scripts. The instructions, codes, computer programs, and scripts may be received from, stored in, or received from and stored in any combination of the memory 5050, the I/O 5070, the communication center 5080, subunits of the previously described elements, other devices, other computing environments. In some embodiments, non-transitory computer-readable medium comprising code may be provided to perform one or more of the various processes, methods, functions, etc. described herein.

In some embodiments, the processor 5030 may include, among other elements, subunits. Subunits may include any combination of a content manager 5032, a geolocation finder 5034, a graphical processor 5036, and a resource allocator 5038. Each of these subunits of the processor 5030 may be communicatively or otherwise operably coupled with each other.

The content manager 5032 may facilitate any combination of generation, modification, analysis, transmission, and presentation of media content associated with methods and systems for network communications. For example, the content manager 5032 may control the environment of the application during the execution of various processes. For purposes of illustration and not limitation, media content for which the content manager 5032 may be responsible may include any combination of advertisements, images, text, themes, audio files, video files, documents, and the like. In some embodiments, the content manager 5032 may also interface with any combination of a third-party content server, memory location, and/or a database.

The geolocation finder 5034, particularly in communication with geolocation information, e.g., provided by GPS subsystems of user devices, may facilitate any combination of detection, generation, modification, analysis, transmission, and presentation of location information and may provide the geotag embodiment of the third data 3023 described in FIG. 3. Location information may include any combination of global positioning system (GPS) coordinates, an internet protocol (IP) address, a media access control (MAC) address, geolocation information, an address, a port number, a zip code, a server number, a proxy name, a proxy number, device information, serial numbers, and the like. In some embodiments, the geolocation finder 5034 may include any one or a combination of various sensors, specifically-purposed hardware elements for enabling the geolocation finder 5034 to acquire, measure, and transform location information.

The graphical processor (GPU) 5036 may facilitate any combination of generation, modification, analysis, processing, transmission, and presentation of visual content. The GPU 5036 may be configured to render visual content for presentation on a user device and/or to analyze visual content for metadata associated with a user or a user device. In some embodiments, this visual content may include the display of search result and/or activatable communication channels. The GPU 5036 may include multiple GPUs and may therefore be configured to perform and/or execute multiple processes in parallel.

The resource allocator 5038 may facilitate any one or combination of the determination, monitoring, analysis, and allocation of resources throughout the server 5020, the system 1000, any component of the system 1000, or other computing environments. For example, the resource allocator 5038 may facilitate interaction between the server 5020, any subunit of the server 5020, and a high volume (e.g. multiple) of users or associated user devices. As such, computing resources of the server 5020 utilized by any one or a combination of the processor 5030, the memory 5050, the I/O 5070, the communication center 5080, and any subunit of these units, such as processing power, data storage space, network bandwidth, and the like may be in high demand at various times during operation. Accordingly, the resource allocator 5038 may be configured to manage the allocation of various computing resources as they are required by particular units or particular subunits of the server 5020.

In some embodiments, the resource allocator 5038 may include sensors and/or other specially-purposed hardware for monitoring performance of each unit and/or subunit of the server 5020, as well as hardware for responding to the computing resource needs of each unit or subunit. In some embodiments, the resource allocator 5038 may utilize computing resources of a second computing environment separate and distinct from the server 5020 to facilitate a desired operation.

In some embodiments, factors affecting the allocation of computing resources by the resource allocator 5038 may include the number of ongoing user device connections and/or other communication channel connections, a duration during which computing resources are required by one or more elements of the server 5020, and/or the like. In some embodiments, computing resources may be allocated to and/or distributed amongst a plurality of second computing environments included in the server 5020 based on one or more factors mentioned above. In some embodiments, the allocation of computing resources of the resource allocator 5038 may include one or more resource allocators 5038 flipping a switch, adjusting processing power, adjusting memory size, partitioning a memory element, transmitting data, controlling one or more input and/or output devices, modifying various communication protocols, and the like. In some embodiments, the resource allocator 5038 may facilitate utilization of parallel processing techniques such as dedicating a plurality of GPUs included in the processor 5030.

The processor 5030 and any or all of the processor subunits, including subunits 5032, 5034, 5036, and 5038, may be used to execute processes initiated by the methods disclosed in the present application.

In some embodiments, the memory 5050 may be used for one or any combination of storing, recalling, receiving, transmitting, and/or accessing various files and/or information during operation of the server 5020. The memory 5050 may include various types of data storage media such as solid state storage media, hard disk storage media, and any other type of data storage medium which may be known to a person of ordinary skill in the art. The memory 5050 may include dedicated hardware elements such as hard drives and/or servers, as well as software elements such as cloud-based storage drives. For example, the memory 5050 may include various subunits such as an operating system unit 5052, an application data unit 5054, an application programming interface (API) unit 5056, a content storage unit 5058, a media storage unit 5060, a secure enclave 5062, and/or a cache storage unit 5064.

The memory 5050 and any of its subunits described here may include any one or any combination of random access memory (RAM), read only memory (ROM), and various forms of secondary storage. RAM may be used to store volatile data and/or to store instructions that may be executed by the processor 5030. For example, the data stored may be any one or a combination of a command, a current operating state of the server 5020, an intended operating state of the server 5020, and the like. As a further example, data stored in the memory 5050 may include instructions related to various methods and/or functionalities described here. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may include one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory 5050 may include one or more databases for storing any data described here. Additionally or alternatively, one or more secondary databases located remotely from the server 200 may be utilized and/or accessed by the memory 5050.

The operating system unit 5052 may facilitate deployment, storage, access, execution, and/or utilization of an operating system utilized by the server 5020 and/or any other computing environment described herein. In some embodiments, the operating system may include various hardware and/or software elements that serve as a structural framework for enabling the processor 5030 to execute various operations. The operating system unit 5052 may further store various pieces of information and/or data associated with operation of the operating system and/or the server 5020 as a whole, such as a status of computing resources (e.g., processing power, memory availability, resource utilization, and/or the like), runtime information, modules to direct execution of operations described herein, user permissions, security credentials, and the like.

The application data unit 5054 may facilitate deployment, storage, access, execution, and/or utilization of an application utilized by the server 5020 or any other computing environment described herein (e.g., a user device). For example, users may be required to download, access, and/or otherwise utilize a software application on a user device such as a smartphone or other internet-enabled device in order for various operations described herein to be performed. As such, the application data unit 5054 may store any information and/or data associated with the application which may allow the application and/or user device to perform methods associated with network communications. As such, information included in the application data unit 5054 may enable a user to execute various operations described here. The application data unit 5054 may further store various pieces of information and/or data associated with operation of the application and/or the server 5020 as a whole, such as a status of computing resources (e.g., processing power, memory availability, resource utilization, and/or the like), runtime information, modules to direct execution of operations described herein, user permissions, security credentials, and the like.

The application programming interface (API) unit 5056 may facilitate deployment, storage, access, execution, and/ or utilization of information associated with APIs of the server 5020 and/or any other computing environment described herein (e.g., a user device). For example, server 5020 may include one or more APIs for enabling various devices, applications, and/or computing environments to communicate with the server 5020, multiple other servers, databases, or other user devices. Accordingly, the API unit 5056 may include API databases containing information that may be accessed and/or utilized by applications and/or operating systems of other devices and/or computing environments associated with network communications. An API may direct communications between the background component of the user device and the server 5020. In some embodiments, each API database may be associated with a customized physical circuit included in the memory unit 5050 and/or the API unit 5056. Additionally, each API database may be public and/or private, and so authentication credentials may be required to access information in an API database.

The content storage unit 5058 may facilitate deployment, storage, access, and/or utilization of information associated with requested content by the server 5020 and/or any other computing environment described here (e.g., a user device such as a mobile device). For example, the content storage unit 5058 may store one or more of images, text, videos, audio content, advertisements, product lists, user recommendations, and metadata to be presented to a user during operations described herein. In some embodiments, the content storage unit 5058 may communicate with the content management unit 5032 to receive and/or transmit content files.

The media storage unit 5060 may facilitate one or more of deployment, storage, access, analysis, and utilization of media content by the server 5020 and any other computing environment described herein (e.g., a user device). Media content may be images, videos, audio files, and any other form of communicative media. For example, the media storage unit 5060 may store communications on system 1000. Further, the media storage unit 5060 may store one or more searches, results, images associated with first or second data generated by any unit or subunit of a server 5020 or user device. Media content generated or used in performing any of the methods disclosed here may be stored in the media storage unit 5060 so that the media content may be analyzed by various components of the server 5020 both in real time and at a time after receipt of the media content. In some embodiments, the media storage unit 5060 may communicate with the GPUs 5036 to facilitate any of the processes described here. In some embodiments, media content may include audio, images, text, video feeds, and/or any other media content associated with methods and systems for network communications.

The secure enclave 5062 may facilitate secure storage of data. In some embodiments, the secure enclave 5062 may include a partitioned portion of storage media included in the memory unit 5050 that is protected by various security measures. For example, the secure enclave 5062 may be hardware secured. In other embodiments, the secure enclave 5062 may include one or more firewalls, encryption mechanisms, and/or other security-based protocols. Authentication credentials of a user may be required prior to providing the user access to data stored within the secure enclave 5062. In some embodiments, the secure enclave 5062 may store sensitive user information such as sensitive personal data and/or data associated with the location of a first computing device user throughout time.

The cache storage unit 5064 may facilitate short-term deployment, storage, access, analysis, and/or utilization of data. In some embodiments, the cache storage unit 5064 may serve as a short-term storage location for data so that the data stored in the cache storage unit 5064 may be accessed quickly. In some embodiments, the cache storage unit 5064 may include RAM and/or other storage media types that enable quick recall of stored data. The cache storage unit 5064 may include a partitioned portion of storage media included in the memory 5050.

The data, codes, and indices used to generate the optimization code may be stored on any or all of the memory subunits, including subunits 5052, 5054, 5056, 5058, 5060, 5062, and 5064, of one or more servers.

The I/O unit 5070 may include hardware and/or software elements for enabling the server 5020 to receive, transmit, and/or present information. For example, elements of the I/O unit 5020 may be used to receive user input from a user via a user device, present results, or communications to the user via the user device, present suggested matches to the user via a user device, and the like. In this manner, the I/O unit 5070 may enable the server 5020 to interface with a human user in a manner such that the user may use the methods described here. As described, the I/O unit 5070 may include subunits such as one of, or a combination of, an I/O device 5072, an I/O calibration unit 5074, and/or a media driver 5076.

The I/O device 5070 may facilitate any one or any combination of the receipt, transmission, processing, presentation, display, input, and output of information as a result of executed processes described here. In some embodiments, the I/O device 5070 may include a plurality of I/O devices. In some embodiments, the U/O device 5070 may include one or more elements of any one or a combination of a user device, a computing system, a server 5020, and a similar device.

The I/O device 5072 may include a variety of elements that enable a user to interface with the server 5020. For example, the I/O device 5072 may include a keyboard, a touchscreen, a button, a sensor, a biometric scanner, a laser, a microphone, a camera, an internet-enabled device, and/or another element for receiving and/or collecting input from a user. Additionally and/or alternatively, the I/O device 5072 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 5072 may communicate with one or more elements of the processor 5030 and/or the memory unit 5050 to execute operations described herein. For example, the I/O device 5072 may include a display, which may utilize the GPU 5036 to present media content stored in the media storage unit 5060 to a user of a user device.

The I/O calibration unit 5074 may facilitate the calibration of the I/O device 5072. For example, the I/O calibration unit 5074 may detect and/or determine one or more settings of the I/O device 5072, and then adjust and/or modify settings so that the I/O device 5072 may operate more efficiently. In some embodiments, the I/O calibration unit 5074 may utilize a media driver 5076 (or multiple media drivers) to calibrate the I/O device 5072. The media driver 5076 may be installed on a user device so that the user device may recognize and/or integrate with the I/O device 50724, thereby enabling media content to be displayed, received, generated, and the like. In some embodiments, the I/O device 5072 may be calibrated by the I/O calibration unit 5074 by based on information included in the media driver 5076.

The communication center 5080 may facilitate establishment, maintenance, monitoring, and/or termination of communications between the server 5020 and other devices such as user devices, other computing environments, third party server systems, and the like. The communication center 5080 may further enable communication between various elements (e.g., units and/or subunits) of the server 200 as needed. In some embodiments, the communication center 5080 may include a network protocol unit 5082, an API gateway 5084, an encryption engine 5086, and/or a communication device 5088. The communication center 5080 may include hardware and/or software elements.

The network protocol unit 5082 may facilitate establishment, maintenance, and/or termination of a communication connection between the server 5020 and another device (e.g. user device) by way of a network. For example, the network protocol unit 5082 may detect and/or define a communication protocol required by a particular network and/or network type. Communication protocols utilized by the network protocol unit 5082 may include Wi-Fi protocols, Li-Fi protocols, cellular data network protocols. Bluetooth® protocols. WiMAX protocols, Ethernet protocols, power line communication (PLC) protocols, and the like. In some embodiments, facilitation of communication between the server 5020 and any other device, as well as any element internal to the server 5020, may include transforming and/or translating data from being compatible with a first communication protocol to being compatible with a second communication protocol. In some embodiments, the network protocol unit 5082 may determine and/or monitor an amount of data traffic to consequently determine which particular network protocol is to be used for establishing a connection with a user device, transmitting data, and/or performing other operations described herein.

The API gateway 5084 may facilitate the enablement of other devices and/or computing environments to access the API unit 5056 of the memory 5050 of the server 5020. For example, a user device may access the API unit 5056 via the API gateway 5084. In some embodiments, the API gateway 5084 may be required to validate user credentials associated with a user of a user device prior to providing access to the API unit 5056 to the user. The API gateway 5084 may include instructions for enabling the server 5020 to communicate with another device.

The encryption engine 5086 may facilitate any one or any combination of translation, encryption, encoding, decryption, and decoding of information received, transmitted, and/or stored by the server 200. For example, the encryption engine 5086 may encrypt data associated with a user's credit card information, etc. Using the encryption engine, each transmission of data may be encrypted, encoded, and/or translated for security reasons, and any received data may be encrypted, encoded, and/or translated prior to its processing and/or storage. In some embodiments, the encryption engine 5086 may generate any one or combination of an encryption key, an encoding key, a translation key, and the like, which may be transmitted along with any data content.

The communication device 5088 may include a variety of hardware and/or software specifically purposed to enable communication between the server 5020 and another device (e.g. user device), as well as communication between elements of the server 5020. In some embodiments, the communication device 5088 may include one or more radio transceivers, chips, analog front end (AFE) units, antennas, processors, memory, other logic, and/or other components to implement communication protocols (wired or wireless) and related functionality for facilitating communication between the server 5020 and any other device. Additionally and/or alternatively, the communication device 5088 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

The present disclosure provides several important technical advantages that will be readily apparent to one skilled in the art from the figures, descriptions, and claims. Moreover, while specific advantages have been enumerated above, various embodiments may include all, some, or none of the enumerated advantages. Any sentence or statement in this disclosure may be associated with one or more embodiments. Reference in the specification to "one embodiment" or "an embodiment" means that a particular feature, structure, or characteristic described in connection with the embodiment is included in at least one embodiment of the disclosure. The appearances of the phrase "in one embodiment," or "in some embodiments" in various places in the specification are not necessarily all referring to the same implementation or embodiment.

Moreover, the above descriptions of the embodiments of the present disclosure have been presented for the purposes of illustration and description. It is not intended to be exhaustive or to limit the present disclosure to the precise form disclosed. Many modifications and variations are possible in light of the above teaching. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure.

The invention claimed is:

1. A method for determining, based on an optimization code, a parameter for a communication and generating, based on the parameter, the communication, the method comprising:

receiving, at one or more servers and from a first computing device, a first data associated with a first computing device user, the first data comprising at least one trait associated with the first computing device user and wherein the at least one trait is associated with a second data;

generating, at the one or more servers, confirmation codes comprising at least two of:

a verification code, wherein the verification code is generated based on a comparison of at least one verified trait associated with the first computing device user to the second data associated with the at least one trait associated with the first computing device user, and indicates a comparative accuracy of the second data associated with the at least one trait relative to third data comprising the at least one verified trait associated with the first computing device user;

a consistency code, wherein the consistency code is generated based on a comparison of a fourth data to the first data, and indicates a comparative consistency of the first data relative to the fourth data; and an activity code, wherein the activity code is generated based on a comparison of a fifth data to activity data comprised in the first data and indicates a comparative activity of the first data relative to the fifth data;

storing the confirmation codes at a database associated with the one or more servers;

retrieving, at the one or more servers and from the database associated with the one or more servers, at least one confirmation code;

generating, at the one or more servers, at least one raw index, wherein the at least one raw index is based on the at least one confirmation code and wherein the at least one raw index is generated by transforming the at least one confirmation code;

generating, at the one or more servers, at least one comparative index, wherein the at least one comparative index is based on the at least one raw index and is generated by transforming the at least one raw index;

generating, at the one or more servers, locus data associated with the at least one comparative index;

generating, at the one or more servers, the optimization code, wherein the optimization code is based on the locus data;

determining, at the one or more servers, based on the optimization code, the parameter for the communication; and generating, at the one or more servers, based on the parameter, the communication.

2. The method of claim 1, wherein the verification code is generated at the one or more servers by:

receiving the third data from a second computing device, wherein the third data comprises the at least one verified trait associated with the first computing device user;

comparing the at least one verified trait associated with the first computing device user to the second data associated with the at least one trait associated with the first computing device user; and generating, based on the comparing, the verification code.

3. The method of claim 1, wherein the consistency code is generated at the one or more servers by:

receiving the fourth data;

comparing the fourth data to the first data; and generating, based on the comparing, the consistency code.

4. The method of claim 1, wherein the activity code is generated at the one or more servers by:

receiving the fifth data;

comparing the fifth data to the activity data comprised in the first data;

and generating, based on the comparing, the activity code.

5. The method of claim 3, wherein the fourth data is associated with one or more of:

contamination of the second data associated with the at least one trait associated with the first computing device user;

random user-generated data, wherein the random user-generated data comprises sixth data not associated with the at least one trait associated with the first computing device user; and theoretical model data, wherein the theoretical model data comprises predictions based on historical data and uses the first data to refine a theoretical model.

6. The method of claim 4, wherein the fifth data is associated with one or more of:

the comparative activity of computing device users associated with the at least one trait associated with the first computing device user;

percentage of unique computing device users associated with the at least one trait associated with the first computing device user during a period; and recentness of information associated with the at least one trait associated with the first computing device user.

7. The method of claim 1, wherein the confirmation codes comprise the verification code, the consistency code, and the activity code.

8. The method of claim 1, wherein the second data comprises textual descriptions or categories.

9. The method of claim 1, wherein either the third data comprises the fourth data or the fourth data comprises the third data.

10. The method of claim 1, wherein the locus data indicates a dependability, reliability, or accuracy of the first data.

11. The method of claim 1, wherein the parameter comprises at least one of a frequency, a number, a content, or a recipient of the communication.

12. A method for determining, based on an optimization code, a parameter for a communication and generating, based on the parameter, the communication, the method comprising:

receiving, at one or more servers and from a first computing device, a first data associated with a first computing device user, the first data comprising at least one trait associated with the first computing device user and wherein the at least one trait is associated with a second data;

generating at the one or more servers, confirmation codes comprising:

a verification code, wherein the verification code is generated at the one or more servers by:

receiving a third data from a second computing device, wherein the third data comprises at least one verified trait associated with the first computing device user, comparing the at least one verified trait associated with the first computing device user comprised in the third data with the second data associated with the at least one trait associated with the first computing device user, and generating the verification code, wherein the verification code is based on a comparison of the at least one verified trait associated with the first computing device user comprised in the third data with the second data associated with the at least one trait associated with the first computing device user and indicates a comparative accuracy of the second data associated with the at least one trait relative to the third data comprising the at least one verified trait associated with the first computing device user;

a consistency code, wherein the consistency code is generated at the one or more servers by:

receiving a fourth data, comparing the fourth data to the first data, and generating the consistency code, wherein the consistency code is based on a comparison of the fourth data to the first data and indicates a comparative consistency of the first data relative to the fourth data;
an activity code, wherein the activity code is generated at the one or more servers by:
receiving a fifth data, and
generating, based on a comparison of activity data comprised in the first data to the fifth data, the activity code, wherein the activity code indicates a comparative activity of the first data relative to the fifth data;
storing the confirmation codes at a database associated with the one or more servers;
retrieving, at the one or more servers and from the database associated with the one or more servers, at least one confirmation code;
generating, at the one or more servers, at least one raw index, wherein the at least one raw index is based on the at least one confirmation code and wherein the at least one raw index is generated by transforming the at least one confirmation code;
generating, at the one or more servers, at least one comparative index, wherein the comparative index is based on the at least one raw index and is generated by transforming the at least one raw index;
generating, at the one or more servers, locus data associated with the at least one comparative index;
generating, at the one or more servers, the optimization code, wherein the optimization code is based on the locus data;
determining, at the one or more servers, based on the optimization code, the parameter for the communication; and
generating, at the one or more servers, based on the parameter, the communication.

13. The method of claim 12, wherein the fourth data comprises contaminated data associated with the least one trait.

14. A system for determining, based on an optimization code, a parameter for a communication and generating, based on the parameter, the communication, the system comprising a server, the server comprising:
a memory comprising server instructions; and
a processing device configured for executing the server instructions, wherein the server instructions cause the processing device to perform operations of:
receiving, from a first computing device, a first data associated with a first computing device user, the first data comprising at least one trait associated with the first computing device user and wherein the at least one trait is associated with a second data;
generating confirmation codes comprising at least two of:
a verification code, wherein the verification code is generated based on a comparison of at least one verified trait associated with the first computing device user to the second data associated with the at least one trait associated with the first computing device user, and
indicates a comparative accuracy of the second data associated with the at least one trait relative to third data comprising the at least one verified trait associated with the first computing device user;
a consistency code, wherein the consistency code is generated based on a comparison of a fourth data to the first data; and
indicates a comparative consistency of the first data relative to the fourth data; and
an activity code, wherein the activity code is generated based on a comparison of activity data comprised in the first data to a fifth data, and indicates a comparative activity of the first data relative to the fifth data;
storing the confirmation codes at a database associated with the server;
retrieving, from the database associated with the server, at least one retrieved confirmation code;
generating at least one raw index, wherein the at least one raw index is based on the at least one confirmation code and wherein the at least one raw index is generated by transforming the at least one confirmation code;
generating at least one comparative index, wherein the comparative index is based on the at least one raw index and is generated by transforming the at least one raw index;
generating locus data associated with the at least one comparative index;
generating the optimization code, wherein the optimization code is based on the locus data;
determining, based on the optimization code, the parameter for the communication; and
generating, based on the parameter, the communication.

15. The system of claim 14, wherein the server instructions cause the processing device to generate the verification code by performing the operations of:
receiving the third data from a second computing device, wherein the third data comprises the at least one verified trait associated with the first computing device user;
comparing the at least one verified trait associated with the first computing device user to the second data associated with the at least one trait associated with the first computing device user; and
generating, based on the comparing, the verification code.

16. The system of claim 14, wherein the server instructions cause the processing device to generate the consistency code by performing the operations of:
receiving the fourth data;
comparing the fourth data to the first data; and
generating, based on the comparing, the consistency code.

17. The system of claim 14, wherein the server instructions cause the processing device to generate the activity code by performing the operations of:
receiving the fifth data;
comparing the fifth data to the activity data comprised in the first data:
and
generating, based on the comparing, the activity code.

18. The system of claim 16, wherein the fourth data is associated with one or more of:
contamination of the second data associated with the at least one trait associated with the first computing device user;
random user-generated data, wherein the random user-generated data comprises sixth data not associated with the at least one trait associated with the first computing device user; and theoretical model data, wherein the theoretical model data comprises predictions based on historical data and uses the first data to refine a theoretical model.

19. The system of claim 17, wherein the fifth data is associated with one or more of:
comparative activity of computing device users associated with the at least one trait associated with the first computing device user;
percentage of unique computing device users associated with the at least one trait associated with the first computing device user during a period; and
recentness of information associated with the at least one trait associated with the first computing device user.

20. The system of claim 14, wherein the confirmation codes comprise the verification code, the consistency code, and the activity code.

* * * * *